United States Patent
Yamaguchi et al.

(10) Patent No.: US 7,677,011 B2
(45) Date of Patent: Mar. 16, 2010

(54) CROSSLINKED SOLID TYPE PRESSURE-SENSITIVE ADHESIVE COMPOSITION, PRESSURE-SENSITIVE ADHESIVE SHEET COMPRISING THE COMPOSITION, AND PRESSURE-SENSITIVE ADHESIVE SHEET FOR WATERPROOFING/AIRPROOFING COMPRISING THE SHEET

(75) Inventors: Tomoo Yamaguchi, Ibaraki (JP); Yasunobu Ina, Ibaraki (JP); Isao Hirose, Ibaraki (JP); Shuzo Fujiwara, Ibaraki (JP); Yoshihiro Kitamura, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 17 days.

(21) Appl. No.: 11/385,747

(22) Filed: Mar. 22, 2006

(65) Prior Publication Data

US 2006/0165980 A1 Jul. 27, 2006

Related U.S. Application Data

(62) Division of application No. 10/462,599, filed on Jun. 17, 2003, now abandoned.

(51) Int. Cl.
*E04B 1/00* (2006.01)
(52) U.S. Cl. .................. 52/746.1; 52/741.3; 427/208.4; 442/151
(58) Field of Classification Search ........... 526/935, 526/931; 428/349; 52/746.1, 741.3; 427/208.4; 442/151
See application file for complete search history.

(56) References Cited

U.S. PATENT DOCUMENTS

| 3,387,416 | A | * | 6/1968 | Martin ........................ 52/208 |
| 3,912,683 | A | | 10/1975 | O'Farrell |
| 3,956,223 | A | | 5/1976 | Chiang et al. |
| 4,331,718 | A | * | 5/1982 | Gleichechagen et al. .... 427/391 |
| 4,404,056 | A | * | 9/1983 | Kakehi et al. .......... 156/244.11 |
| 4,588,637 | A | * | 5/1986 | Chiu .................... 428/355 BL |
| 4,997,709 | A | | 3/1991 | Huddleston et al. |
| 5,663,239 | A | * | 9/1997 | Coolbaugh et al. .......... 525/314 |
| 5,681,654 | A | | 10/1997 | Mamish et al. |
| 5,914,157 | A | | 6/1999 | Munson et al. |
| 6,180,717 | B1 | | 1/2001 | Kawazura et al. |
| 6,284,369 | B1 | * | 9/2001 | Kume et al. ........... 428/355 AC |
| 6,881,796 | B2 | * | 4/2005 | Yamaguchi et al. ...... 525/332.7 |
| 2001/0006723 | A1 | | 7/2001 | Yamaguchi et al. |

* cited by examiner

*Primary Examiner*—Thao T. Tran
(74) *Attorney, Agent, or Firm*—Sughrue Mion, PLLC

(57) ABSTRACT

A solid type pressure-sensitive adhesive composition capable of being applied without the necessity of using an organic solvent or water and a pressure-sensitive adhesive sheet, which are excellent in both adhesive force and holding power and, in particular, undergo no decrease in low-temperature adhesive force even when the adhesive layer thickness is small. The crosslinked solid type pressure-sensitive adhesive composition comprising (a) a rubbery polymer, (b) a tackifier, and (c) a crosslinking agent comprising at least one member selected from the group consisting of thiuram vulcanizing agents, quinoid vulcanizing agents, quinone dioxime vulcanizing agents, and maleimide vulcanizing agents.

7 Claims, No Drawings

CROSSLINKED SOLID TYPE PRESSURE-SENSITIVE ADHESIVE COMPOSITION, PRESSURE-SENSITIVE ADHESIVE SHEET COMPRISING THE COMPOSITION, AND PRESSURE-SENSITIVE ADHESIVE SHEET FOR WATERPROOFING/AIRPROOFING COMPRISING THE SHEET

CROSS REFERENCE TO RELATED APPLICATIONS

This is a divisional of application Ser. No. 10/462,599 filed on Jun. 17, 2003 now abandoned. The entire disclosure of the prior application, application Ser. No. 10/462,599 is hereby incorporated by reference.

FIELD OF THE INVENTION

The present invention relates to a crosslinked solid type pressure-sensitive adhesive composition which does not substantially contain a solvent, and a pressure-sensitive adhesive sheet (including a tape, film and other form) obtained by applying the composition with heating to a substrate. The invention further relates to a pressure-sensitive adhesive sheet for waterproofing/airproofing comprising the pressure-sensitive adhesive sheet.

DESCRIPTION OF THE RELATED ART

Due to the enforcement of the Housing Quality Security Promotion Law, it is desired to completely eliminate the leaking of rain in houses, and various waterproof sheets are used. Recently, various airproof sheets also have been used with the demand for highly airtight, highly heat-insulated houses, which are highly effective in energy saving. Conventional pressure-sensitive adhesive sheets for use as such waterproof or airproof pressure-sensitive adhesive sheets employ a pressure-sensitive adhesive comprising a rubber-asphalt, butyl rubber or acrylic polymer as the base. The butyl rubber pressure-sensitive adhesive has an actual durability of 30 years and shows relatively satisfactory adhesiveness at high temperatures and low temperatures. With respect to the mode of failure in peeling from adherends, which is a factor important for the function of waterproofing, the butyl rubber pressure-sensitive adhesive shows cohesive failure. Pressure-sensitive adhesive sheets in which the adhesive does not show cohesive failure upon peeling are undesirable because a space is formed between the adherend and the pressure-sensitive adhesive to pose the possibility that water might penetrate into the space to impair waterproofing. On the other hand, the rubber-asphalt pressure-sensitive adhesive has a durability as short as about 10 years and shows poor adhesiveness at high temperatures and low temperatures. The acrylic pressure-sensitive adhesive, which has been marketed recently, is less apt to show cohesive failure upon peeling from adherends and whether or not this pressure-sensitive adhesive retains a sufficient waterproofing function over many years has not been demonstrated.

As described above, the butyl rubber pressure-sensitive adhesive is superior in properties to other pressure-sensitive adhesives for waterproofing/airproofing. However, the butyl rubber pressure-sensitive adhesive is required to adhere to various adherends including wood plates, plywoods, and moistureproof/waterproof sheets so as to adhere to all adherends among recent new house building materials and retain waterproofing/airproofing properties over a long period of time. Furthermore, the pressure-sensitive adhesive is desired to adhere even at high temperatures and low temperatures as in midsummer and midwinter. Thus, the butyl rubber pressure-sensitive adhesive is required to be further improved in performance.

A solid type pressure-sensitive adhesive has hitherto been used in pressure-sensitive adhesive sheets for waterproofing/airproofing. A solid type pressure-sensitive adhesive composition is a solvent-free and non-aqueous pressure-sensitive adhesive composition which contains neither any organic solvent causative of environmental pollution nor water, which necessitates much energy for drying. It is generally produced by incorporating a tackifier into a rubbery polymer, represented by natural rubber, as the main ingredient, adding thereto a filler, e.g., fine calcium carbonate particles, softener, e.g., an oil, antioxidant, and the like, in appropriate proportions, and kneading this mixture with a kneader, Banbury mixer, mixing rolls, or the like with heating to obtain a pressure-sensitive adhesive composition which is solid at ordinary temperature.

Such solid type pressure-sensitive adhesive compositions are uncrosslinked compositions which have poor cohesive force especially at high temperatures and hence have often caused positional shifting. Furthermore, waterproof/airproof tapes should adhere to various adherends, and most of these have had an adhesive layer thickness as large as about from 0.2 to 0.5 mm because reduced adhesive layer thicknesses, in particular, result in a considerably reduced adhesive force at low temperatures. Because of this, there has been a desire for a pressure-sensitive adhesive sheet which, even when the adhesive layer thickness is small, can exhibit the same functions as pressure-sensitive adhesive sheets heretofore in use so as to reduce the amount of the pressure-sensitive adhesive composition used.

SUMMARY OF THE INVENTION

The present invention has been made under these circumstances.

Accordingly, one object of the invention is to provide a crosslinked solid type pressure-sensitive adhesive composition capable of being applied without the necessity of using an organic solvent or water, which is excellent in both adhesive force and holding power and, in particular, undergo no decrease in low-temperature adhesive force even when the adhesive layer thickness is small.

Another object of the invention is to provide a pressure-sensitive adhesive sheet using the composition.

Still another object of the invention is to provide a pressure-sensitive adhesive sheet for waterproofing/airproofing, using the sheet.

It is thought that a solid type pressure-sensitive adhesive composition comprising a rubbery polymer as the main ingredient can be made to have an enhanced cohesive force by crosslinking with a crosslinking agent as in the case of ordinary rubber products, and the problems described above can be thus avoided. Crosslinked rubber products other than pressure-sensitive adhesives are mostly produced by a method in which a crosslinking agent is incorporated beforehand into a rubbery polymer through kneading and the resultant composition is formed into a sheet or another desired shape before being crosslinked. In constant, in the case of pressure-sensitive adhesive sheets employing a solid type pressure-sensitive adhesive, a pressure-sensitive adhesive composition capable of being crosslinked in the step of kneading a rubbery polymer together with materials such as a tackifier and a softener is thought to be optimal from the standpoint of production steps because the process for producing these pressure-sensitive adhesive sheets does not include a heating step in which the pressure-sensitive adhesive composition applied is heated. In this case, the practical kneading temperature during the kneading is about 180° C. at the most, and it is considerably difficult to heat the composition to, for example, 200° C., which is necessary for the crosslinking reaction with sulfur generally used for the crosslinking of butyl rubbers. In addition, although crosslinking with sulfur generally requires about 20 to 30 minutes, such long-term kneading with heating cuts molecular chains of the rubbery polymer due to heat and shear force and thereby reduces rather than increases the cohesive force. Consequently, the time period of the kneading step is about from 5 to 20 minutes at the most. Because of these, it was thought that a crosslinking agent which undergoes a crosslinking reaction at a relatively low temperature in a short time period should be used in the invention.

Based on the idea described above, the present inventors selected a crosslinking agent capable of reacting with a rubber-based pressure-sensitive adhesive during kneading. They have found that when a rubber-based pressure-sensitive adhesive is kneaded together with this crosslinking agent with heating while monitoring the kneading torque and suitably regulating the kneading temperature and kneading time, then the crosslinking agent can be evenly dispersed in the material without causing the rubbery polymer to undergo a molecular weight decrease due to molecular chain cutting. As a result, the desired crosslinking can be realized and the cohesive force can be enhanced. The invention has thus been completed.

The crosslinked solid type pressure-sensitive adhesive composition according to the invention comprises (a) a rubbery polymer, (b) a tackifier, and (c) a crosslinking agent comprising at least one member selected from the group consisting of thiuram vulcanizing agents, quinoid vulcanizing agents, quinone dioxime vulcanizing agents, and maleimide vulcanizing agents (claim 1).

In a preferred embodiment, the rubbery polymer (a) is a butyl rubber.

The pressure-sensitive adhesive sheet in sheet or tape form according to the invention comprises a substrate and formed thereover a pressure-sensitive adhesive layer comprising the crosslinked solid type pressure-sensitive adhesive composition having the constitution described above.

The pressure-sensitive adhesive sheet is used as a pressure-sensitive adhesive sheet for waterproofing and/or airproofing.

DETAILED DESCRIPTION OF THE INVENTION

The crosslinked solid type pressure-sensitive adhesive composition of the invention comprises (a) a rubbery polymer, (b) a tackifier, and (c) a crosslinking agent comprising at least one member selected from the group consisting of thiuram vulcanizing agents, quinoid vulcanizing agents, quinone dioxime vulcanizing agents, and maleimide vulcanizing agents. The rubbery polymer (a) used in the invention preferably is a butyl rubber from the standpoints of durability and weatherability. Most preferred butyl rubber is a regenerated butyl rubber, which has excellent processability. The rubbery polymer (a) preferably has a Mooney viscosity $ML_{1+4}$(100° C.) of from 20 to 100. Besides butyl rubbers, rubbery polymers which may be used according to need are synthetic rubbers such as butadiene rubbers, isoprene rubbers, polyisobutylene and blends of two or more of these.

The tackifier (b) used in the invention serves not only to impart tackiness but to facilitate thermal softening. Examples of this tackifier include various resins compatible with the rubbery polymer, such as petroleum resins, phenolic resins, rosin resins, and terpene resins. Such a tackifier is used in an amount of from 20 to 200 parts by weight, preferably from 30 to 150 parts by weight, per 100 parts by weight of the rubbery polymer.

The crosslinking agent (c) used in the invention is a crosslinking agent comprising at least one member selected from the group consisting of thiuram vulcanizing agents, quinoid vulcanizing agents, quinone dioxime vulcanizing agents, and maleimide vulcanizing agents.

Examples of the thiuram vulcanizing agents include tetramethylthiuram disulfide, tetraethylthiuram disulfide, tetrabutylthiuram disulfide, tetrakis(2-ethylhexyl)thiuram disulfide, dipentamethylenethiuram tetrasulfide, and tetramethylthiuram monosulfide.

Examples of the quinoid vulcanizing agents include poly-p-dinitrosobenzene.

Examples of the quinone dioxime vulcanizing agents include p-quinone dioxime and p,p'-dibenzoylquinone dioxime.

Examples of the maleimide vulcanizing agents include N,N'-m-phenylenedimaleimide, N,N'-p-phenylenedimaleimide, and N,N'-ethylenedimaleimide.

Those crosslinking agents have common properties, i.e., they can be used for crosslinking at low temperatures (e.g., 180° C. or lower) and have a high crosslinking rate. These crosslinking agents are used in an amount of generally from 0.5 to 20 parts by weight, preferably from 0.5 to 10 parts by weight, per 100 parts by weight of the rubbery polymer.

Examples of compounding agents for use in the invention as optional ingredients include fillers such as calcium carbonate, talc, and magnesium oxide, softeners such as polybutene and process oil, antioxidants, and plasticizers. The amounts of such ingredients used per 100 parts by weight of the rubbery polymer are as follows. The amount of the filler is up to 200 parts by weight, preferably from 10 to 150 parts by weight, the amount of the softener is up to 150 parts by weight, preferably from 5 to 100 parts by weight, and the amount of the antioxidant is up to 5 parts by weight, preferably from 0.5 to 5 parts by weight, more preferably from 1 to 3 parts by weight.

In the invention, the rubbery polymer and tackifier described above are heated and kneaded as essential ingredients together with any of those optional ingredients without using any organic solvent or water at all, and the crosslinking agent is further added thereto. The resulting mixture is continuously heated and kneaded to thereby uniformly disperse the crosslinking agent in the mixture and simultaneously react it uniformly with the rubbery polymer. Thus, a pressure-sensitive adhesive composition is obtained which has a structure in which the rubbery polymer has been moderately crosslinked.

Kneading with heating can be conducted using a batch kneading machine such as a pressure kneader, Banbury mixer or mixing rolls, or a continuous kneading machine such as a twin-screw kneader. In this kneading operation, a suitable kneading temperature is selected from a range of about from 100 to 200° C. according to the kind of the rubber, etc. The kneading time is suitably selected according to the kneading temperature so that the total kneading time for each ingredient is in the range of from 3 to 60 minutes. During the kneading, the kneading torque is monitored and the end point for torque increase is judged to be the end point for the crosslinking reaction.

The solid type pressure-sensitive adhesive composition thus crosslinked has satisfactory moldability such that it readily softens upon heating. Consequently, when this pressure-sensitive adhesive composition is applied with heating to a substrate such as a fabric (e.g., cotton, rayon, artificial-fiber, or nonwoven fabric), a paper (e.g., Japanese paper or kraft paper), a plastic (e.g., cellophane, polyethylene, polyester, poly(vinyl chloride), cellulose acetate, polypropylene, poly(ethylene terephthalate), polystyrene, or polyacrylonitrile), a metal foil, or a plastic laminate of any of these by means of calender rolls, an extruder, or the like, then a pressure-sensitive adhesive sheet comprising the substrate and formed thereon a layer comprising the pressure-sensitive adhesive composition can be produced in the form of a sheet, tape, film, or the like. Since this process does not use any organic solvent causative of environmental pollution, or water which necessitates much energy for drying, there is no need of conducting a step for drying a coated substrate in a drying oven. This process is hence friendly to the global environment and can greatly contribute to energy saving.

The adhesive layer thickness, i.e., the thickness of the layer comprising the pressure-sensitive adhesive composition described above, can be regulated to a value in the wide range of generally from 50 to 500 μm, preferably from 100 to 300 μm. Even when the adhesive layer has a small thickness within this range, the pressure-sensitive adhesive sheet does not show an abrupt decrease in tackiness properties at low temperatures unlike pressure-sensitive adhesive sheets heretofore in use. Consequently, the pressure-sensitive adhesive sheet of the invention has an effect that the adhesive layer thickness can be reduced and, hence, application of a pressure-sensitive adhesive composition in an unnecessarily large amount can be avoided.

The substrate may be subjected to conventional treatments in order to improve the adhesive force (anchoring force) of the pressure-sensitive adhesive layer. For example, that side of the substrate which is coated with the pressure-sensitive adhesive layer may be subjected to a surface treatment, such as a corona treatment or plasma treatment, or coated with a primer layer. That side of the substrate which is not coated with the pressure-sensitive adhesive layer may be suitably coated with a release agent represented by a silicone resin or a fluororesin in order to facilitate the unwinding of a roll of the sheet.

The pressure-sensitive adhesive sheet of the invention thus produced is excellent not only in adhesive force but in holding power because of the improved cohesive force due to moderate crosslinking. Even when the adhesive sheet is allowed to stand at high temperatures, it retains a high cohesive force. The pressure-sensitive adhesive sheet of the invention can hence be used in various bonding applications. However, the adhesive sheet is useful as a waterproof or airproof sheet or the like for the waterproofing/airproofing of houses so as to take advantage of the high waterproofing properties, durability, and weatherability thereof. The adhesive sheet can be extensively utilized for the waterproofing of buildings other than houses.

The invention will be explained below in greater detail by reference to the following Examples, but the invention should not be construed as being limited to these Examples in any way.

EXAMPLE 1

1,000 g of a regenerated butyl rubber (Mooney viscosity $ML_{1+4}(100°C.)$, 44±6) was introduced into a 3 liters pressure kneader heated to 150° C. About 500 g of a calcium carbonate powder was further introduced into the kneader. The resulting mixture was kneaded for about 5 minutes. 400 g of petroleum resin, "Escorez 1202", manufactured by Exxon Co., as a tackifier was introduced into the kneader, and the resulting mixture was kneaded for about 10 minutes. Further, 500 g of "Polybutene HV300", manufactured by Nippon Oil Co., Ltd., as a softener was introduced into the kneader in several portions, and the resulting mixture was kneaded for about 10 minutes. Finally, 20 g of quinoid vulcanizing agent, "Vulnoc DNB", manufactured by Ouchi-Shinko Chemical Industrial Co., Ltd., as a crosslinking agent was introduced into the kneader to crosslink the mixture with kneading for about 5 minutes. This mixture was then taken out of the kneader. Thus, a pressure-sensitive adhesive composition was prepared.

This pressure-sensitive adhesive composition was applied with heating at 100° C. to a substrate (0.12 mm-thick woven fabric whose back side had been treated) by means of an 8-inch four-roll calender so as to result in an adhesive layer thickness of 0.25 mm. Thus, a pressure-sensitive adhesive sheet was produced.

EXAMPLE 2

A pressure-sensitive adhesive sheet was produced in the same manner as in Example 1, except that the adhesive layer thickness was changed to 0.1 mm.

EXAMPLE 3

A pressure-sensitive adhesive sheet was produced in the same manner as in Example 1, except that 20 g of thiuram vulcanizing agent, "Nocceler TT", manufactured by Ouchi-Shinko Chemical Industrial Co., Ltd., was used as a crosslinking agent.

EXAMPLE 4

A pressure-sensitive adhesive sheet was produced in the same manner as in Example 1, except that 20 g of quinone dioxime vulcanizing agent, "Vulnoc GM", manufactured by Ouchi-Shinko Industrial Chemical Co., Ltd., was used as a crosslinking agent, and the kneading after addition of the vulcanizing agent was conducted at 180° C. for 5 minutes.

EXAMPLE 5

A pressure-sensitive adhesive sheet was produced in the same manner as in Example 1, except that 20 g of maleimide vulcanizing agent, "Vulnoc PM", manufactured by Ouchi-Shinko Industrial Chemical Co., Ltd., was used as a crosslinking agent, and the kneading after addition of the vulcanizing agent was conducted at 180° C. for 5 minutes.

Comparative Example 1

A solid type pressure-sensitive adhesive composition was prepared in the same manner as in Example 1, except that no crosslinking agent was added and a crosslinking treatment was not conducted. This composition was used to produce a pressure-sensitive adhesive sheet in the same manner as in Example 1.

Comparative Example 2

A pressure-sensitive adhesive sheet was produced in the same manner as in Comparative Example 1, except that the adhesive layer thickness was changed to 0.1 mm.

Comparative Example 3

A solid type pressure-sensitive adhesive composition was prepared in the same manner as in Example 1, except that 20 g of sulfur was added as a crosslinking agent. This composition was used to produce a pressure-sensitive adhesive sheet in the same manner as in Example 1.

Comparative Example 4

A solid type pressure-sensitive adhesive composition was prepared in the same manner as in Example 1, except that no tackifier was added. This composition was used to produce a pressure-sensitive adhesive sheet in the same manner as in Example 1.

The pressure-sensitive adhesive sheets obtained in Examples 1 to 5 and Comparative Examples 1 to 4 were subjected to an adhesive force test and a holding power test by the following methods. The results of these tests are shown in the Table below.

Adhesive Force Test

A pressure-sensitive adhesive sheet having a width of 25 mm was applied to each of a stainless-steel plate and a wood plate (hemlock). The adhesive sheet applied was peeled off at a peel angle of 180°, a peel rate of 300 mm/min, and temperatures of 0° C. and 60° C. to measure the adhesive force (N/25-mm width).

Holding Power Test

A pressure-sensitive adhesive sheet having dimensions of 25 mm by 25 mm was applied to a stainless-steel plate. In a 60° C. atmosphere, a 500 g stationary load was vertically hung on one end of the pressure-sensitive adhesive sheet, and the time (min) required for the pressure-sensitive adhesive sheet to shift and fall off the plate was measured. The pressure-sensitive adhesive layer was further examined for the mode of failure.

TABLE

| | Adhesive layer thickness (μm) | Adhesive force test [N/25 mm] | | | | Holding power test (min)/ Mode of failure |
| --- | --- | --- | --- | --- | --- | --- |
| | | On stainless-steel plate | | On wood plate | | |
| | | 0° C. | 60° C. | 0° C. | 60° C. | |
| Example 1 | 0.25 | 49 | 10 | 29 | 11 | 6/cohesive failure |
| Example 2 | 0.10 | 45 | 9 | 26 | 10 | 7/cohesive failure |
| Example 3 | 0.25 | 43 | 12 | 30 | 13 | 5/cohesive failure |
| Example 4 | 0.25 | 48 | 12 | 28 | 12 | 6/cohesive failure |
| Example 5 | 0.25 | 47 | 11 | 27 | 11 | 6/cohesive failure |
| Comparative Example 1 | 0.25 | 40 | 7 | 29 | 8 | 2/cohesive failure |
| Comparative Example 2 | 0.10 | 9 | 6 | 15 | 7 | 1/cohesive failure |
| Comparative Example 3 | 0.25 | 41 | 7 | 28 | 8 | 2/cohesive failure |
| Comparative Example 4 | 0.25 | 0 | 2 | 0 | 0 | 0/interfacial delamination |

The results in the Table above show that the pressure-sensitive adhesive sheets obtained in Examples 1 to 5 according to the invention each were excellent both in adhesive force at the low and high temperatures and in holding power regardless of the adhesive layer thickness. The mode of failure of the adhesive sheets was cohesive failure. These adhesive sheets can hence be judged satisfactory in waterproofing properties.

Contrary to this, the pressure-sensitive adhesive sheets of Comparative Examples 1 and 2, which had not undergone any crosslinking treatment with a vulcanizing agent, showed a poor holding power, and the pressure-sensitive adhesive sheet of Comparative Example 2, which had a reduced adhesive layer thickness, showed a considerably poor adhesive force at the low temperature. The pressure-sensitive adhesive sheet of Comparative Example 3, for which sulfur had been added as a vulcanizing agent, failed to have improved properties because sufficient vulcanization had not proceeded under the low-temperature short-duration vulcanization conditions described in Example 1. Furthermore, the pressure-sensitive adhesive sheet of Comparative Example 4, for which no tackifier had been added, showed a low adhesive force and a low holding power and failed to have the desired properties.

As described above, since the pressure-sensitive adhesive composition of the invention is obtained by adding a tackifier to a rubbery polymer and crosslinking the mixture with a vulcanizing agent, it is excellent in both adhesive force and holding power and, in particular, undergoes no decrease in low-temperature adhesive force even when the adhesive layer thickness is small. Furthermore, since the adhesive composition thermally softens and can be molded easily, it can be used to produce a pressure-sensitive adhesive sheet without the necessity of using an organic solvent or water. In addition, since no drying step is necessary after application, the adhesive composition can contribute to energy saving and is desirable from the standpoint of global environment.

It should further be apparent to those skilled in the art that various changes in form and detail of the invention as shown and described above may be made. It is intended that such changes be included within the spirit and scope of the claims appended hereto.

This application is based on Japanese Patent Application No. 2001-230730 filed Jul. 31, 2001, the disclosure of which is incorporated herein by reference in its entirety.

What is clamed is:

1. A method for waterproofing and/or airproofing utilizing a pressure-sensitive adhesive sheet, comprising applying a pressure-sensitive adhesive sheet to a building material to water and/or air proof the material, wherein the pressure-sensitive adhesive sheet comprising a substrate and formed thereover a pressure-sensitive adhesive layer comprising a crosslinked solid type pressure-sensitive adhesive composition comprising (a) a rubbery polymer, (b) a tackifier, and (c) a crosslinking agent comprising at least one member selected from the group consisting of quinoid vulcanizing agents, quinone dioxime vulcanizing agents, and maleimide vulcanizing agents, wherein the substrate is a fabric, a plastic, a metal foil, or a plastic laminate thereof, and wherein the adhesive layer has a thickness of from 50 to 300 μm.

2. The method for waterproofing and/or airproofing as claimed in claim 1, wherein the rubbery polymer (a) is a butyl rubber.

3. The method for waterproofing and/or airproofing as claimed in claim 1, wherein the rubbery polymer (a) is a regenerated butyl rubber.

4. The method for waterproofing and/or airproofing as claimed in claim 1, wherein the rubbery polymer (a) has a Mooney viscosity $ML_{1+4}$(100° C.) of from 20 to 100.

5. The method for waterproofing and/or airproofing as claimed in claim 1, wherein the tackifier (b) is a resin compatible with the rubbery polymer.

6. The method for waterproofing and/or airproofing as claimed in claim 1, wherein the tackifier (b) is used in an amount of from 20 to 200 parts by weight per 100 parts by weight of the rubbery polymer.

7. The method for waterproofing and/or airproofing as claimed in claim 1, wherein the crosslinking agent (c) is used in an amount of from 0.5 to 20 parts by weight per 100 parts by weight of the rubbery polymer.

* * * * *